(12) United States Patent
Harden (10) Patent No.: US 9,678,411 B1
(45) Date of Patent: Jun. 13, 2017

(54) FLOATING ACTION CAMERA MOUNT (71) Applicant: BBY SOLUTIONS, INC., Richfield, MN (US)

(72) Inventor: Kenneth Harden, Eden Prairie, MN (US)

(73) Assignee: BBY SOLUTIONS, INC., Richfield, MN (US)

( * ) Notice: Subject to any disclaimer, the term of this patent is extended or adjusted under 35 U.S.C. 154(b) by 0 days.

(21) Appl. No.: 15/084,023

(22) Filed: Mar. 29, 2016

(51) Int. Cl.
G03B 17/56 (2006.01)
B63B 22/00 (2006.01)

(52) U.S. Cl.
CPC ............ G03B 17/561 (2013.01); B63B 22/00 (2013.01); G03B 17/563 (2013.01)

(58) Field of Classification Search
None
See application file for complete search history.

(56) References Cited

U.S. PATENT DOCUMENTS

| 3,827,069 A * | 7/1974 | Stowell | G03B 17/08 396/144 |
| 2003/0007795 A1 | 1/2003 | Grober | |
| 2004/0208499 A1 | 10/2004 | Grober | |
| 2005/0102883 A1 * | 5/2005 | Temes | A01K 93/00 43/26.1 |
| 2006/0254121 A1 * | 11/2006 | Huynh | A01K 93/02 43/44.95 |
| 2008/0248703 A1 | 10/2008 | Russell et al. | |
| 2012/0315813 A1 * | 12/2012 | Rossini | B63B 22/00 441/1 |
| 2015/0113853 A1 * | 4/2015 | McKeough | A01K 97/125 43/17 |
| 2016/0026071 A1 * | 1/2016 | Kanai | G03B 17/08 396/25 |

* cited by examiner

Primary Examiner — W B Perkey
(74) Attorney, Agent, or Firm — Schwegman Lundberg & Woessner, P.A.

(57) ABSTRACT

Devices and methods disclosed here can include a floating action camera mount. The floating action camera mount can include a vessel having an exterior surface. The vessel can be floatable in a liquid. A camera mount can be coupled to the exterior surface of the vessel for attaching an action camera to the floating action camera mount. At least one positioning weight can be coupled along the vessel. For instance, the positioning weight can be adjustably positionable along the exterior surface of the vessel between a first weight location and a second weight location. In the first weight location, the vessel, and correspondingly the camera mount, can be positioned in a first orientation with respect to a surface of the liquid. In the second weight location, the vessel, and correspondingly the camera mount, can be positioned in a second orientation with respect to the surface of the liquid.

21 Claims, 7 Drawing Sheets

FLOATING ACTION CAMERA MOUNT

TECHNICAL FIELD

This document pertains generally, but not by way of limitation, to camera mounts, such as floating action camera mounts.

BACKGROUND

Floating camera mounts can be used by filmmakers, divers, athletes, or the like to record still images and/or video for later viewing. Many existing floating camera mounts include at least one buoy for flotation. A camera can be attached to the buoy, such as an upper portion of the buoy. For example, the camera can be coupled to the buoy by an arm. In some existing floating camera mounts, the arm can be positionable to adjust the height, or angle of view of the camera, and the camera is attached or suspended underneath the one or more buoys to capture underwater images.

For many existing floating camera mounts, the buoy is configured to maintain a generally upright position in the water. In other words, many buoys are not designed to flip over or tip over during operation. The camera is coupled at a location at the top of the buoy, away from the center of buoyancy of the buoy, in many existing examples. Floating camera mounts can include anchors to hold a location or a generally upright position of the floating camera mount as it floats in a body of water. For example, the anchors can be coupled to cleats that are fixably attached to the buoy. Such buoys can include a flat surface or elongate shape along the lower portion of the buoy. To counter any sway of the buoy resulting from wave swells, some floating camera mounts include a gimbal for maintaining the viewpoint of the camera.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present application relates to devices and techniques for a floating camera mount, such as a floating action camera mount. The following detailed description and examples are illustrative of the subject matter disclosed herein; however, the subject matter disclosed is not limited to the following description and examples provided. Portions and features of some embodiments may be included in, or substituted for, those of other embodiments. Embodiments set forth in the claims encompass all available equivalents of those claims.

The present disclosure is directed to an action camera that is attachable to a floating mount that can be lightweight, easy to transport, and repositionable in the water to orient the action camera in any direction. The present subject matter can provide a solution to this problem, such as by coupling an action camera to a vessel having repositionable weights for rotating the vessel to orient the viewpoint of the action camera toward a point of interest.

For instance a vessel can include an exterior surface and an internal volume. The exterior surface can be of sufficient area so the vessel is floatable in a liquid (e.g., water). A camera mount can be coupled to the exterior surface of the vessel to construct a floating action camera mount. At least one positioning weight can be coupled along the vessel, such as the exterior surface of the vessel. The positioning weight can be adjustably positionable along the exterior surface of the vessel to rotate the vessel and accordingly the orient the viewpoint of the action camera toward the point of interest. In an example, the positioning weight can be adjustably positionable between a first weight location and a second weight location including. In the first weight location, the vessel, and correspondingly the camera mount, can be positioned in a first orientation with respect to a surface of the liquid. In the second weight location, the vessel, and correspondingly the camera mount, can be positioned in a second orientation with respect to the surface of the liquid.

In an example, the size and weight of the floating action camera mount can be decreased by attaching the action camera to an inflatable vessel. For instance, the vessel can include an inflatable bladder that can include an inflatable configuration where the floating action camera mount is in use and a deflated configuration for transporting or storing the floating action camera mount. Accordingly, the size and/or the weight of the floating action camera mount can be decreased, for example, when the vessel is deflated.

In an example, the vessel can include a scalable port. Ballast, such as water, sand, or the like can be added to the inner volume (e.g., cavity) of the vessel through the sealable port. Accordingly, the stability of the floating action camera mount can be increased and correspondingly the images captured by the action camera can be improved.

Figure 1:
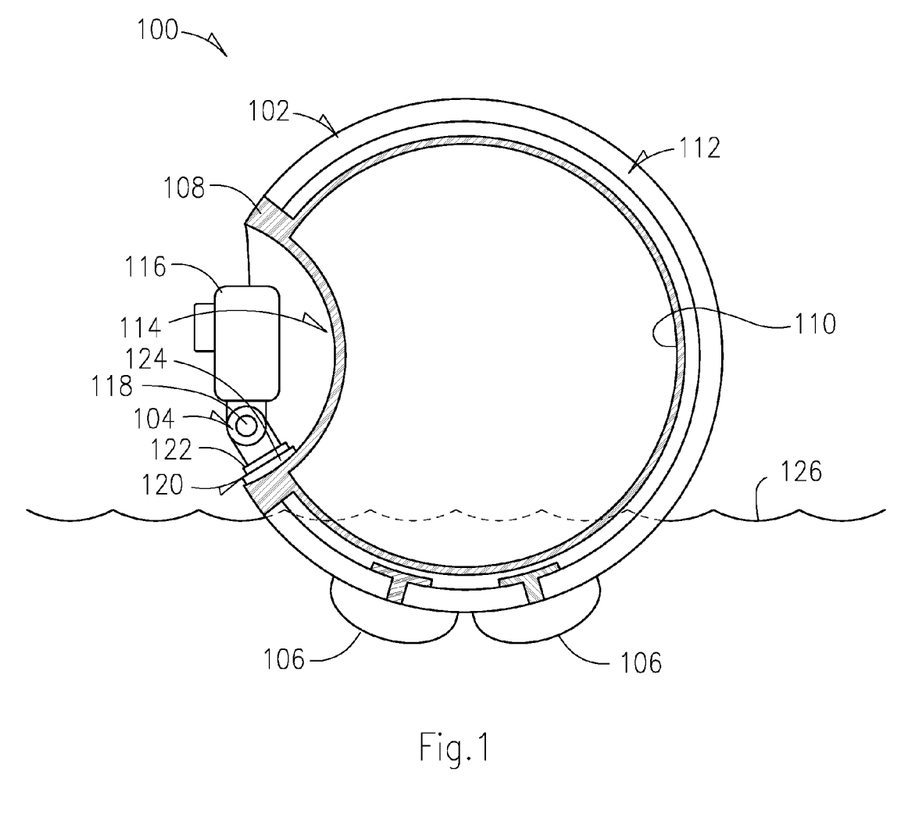
FIG. 1 is a cross section view of a floating action camera mount including at least one positioning weight, according to an embodiment.

FIG. 1 is a cross section view of an exemplary floating action camera mount 100. The floating action camera mount 100 can include a vessel 102, a camera mount 104, and at least one positioning weight 106. The camera mount 104 can be coupled to the vessel 102, for instance, along an exterior surface 108 of the vessel 102 for attaching an action camera 116 to the vessel 102. The action camera 116 can include, but is not limited to, a digital camera, a GoPro®, smart phone, weatherproof camera, or the like. The positioning weight 106 can be adjustably coupled along the exterior surface 108 of the vessel 102. The exterior surface 108 of the vessel 102 can include an inside and an outside. In an example, the positioning weight 106 can be positioned along the inside or the outside of the exterior surface 108.

Figure 4:
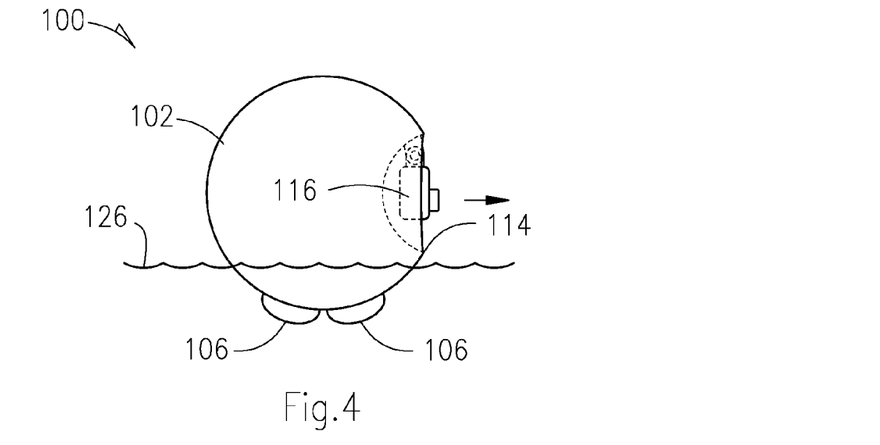
FIG. 4 illustrates an exemplary floating action camera mount including a plurality of positing weights positioned at a location lateral to a camera mount and a viewpoint of the camera is oriented in a substantially horizontal direction, according to an embodiment.
Figure 9:
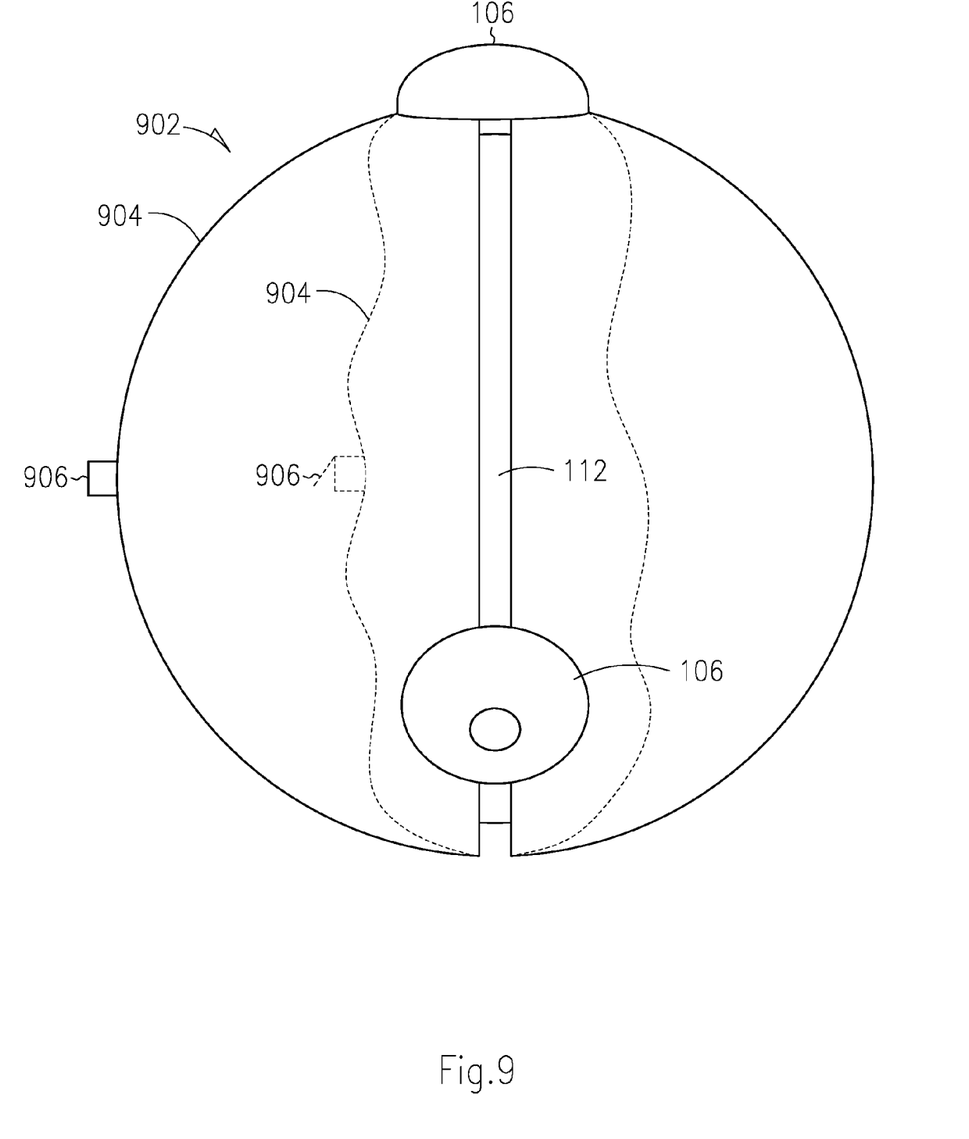
FIG. 9 illustrates an example of an inflatable floating action camera mount, according to an embodiment.

As shown in the example of FIG. 1, the vessel 102 can include a spherical shape. In other examples, the vessel 102 can include rectangular, triangular, oval or other shapes. The vessel 102 can be constructed from a material including, but not limited to, plastic (e.g., acrylonitrile butadiene styrene, polycarbonate, polyamide, polyoxymethylene), rubber, foam, or the like. In an example, the vessel 102 can include an internal volume 110. For instance, the vessel 102 can include a cavity. In other words, the vessel 102 can include a hollow shell of material, for example, the exterior surface 108 being the shell. The exterior surface 108 can seal the cavity to improve the buoyancy of the vessel 102. In an example, the cavity can be filled with air, water, foam, or the like as shown in FIG. 4 and described herein. In the example of FIG. 9, the vessel 102 can constructed from a rubber or polymer and can be inflatable as described further herein. A size of the vessel 102 can include a length, width, height, or diameter including, but not limited to, six-inches, twelve-inches, twenty-four inches, thirty-six inches, or other dimensions.

The camera mount 104 can include an adapter 118 for coupling the action camera 116 to the camera mount 104 and accordingly to the vessel 102. The adapter 118 can include a fastener for coupling the action camera 116 to the camera mount 104. For instance, the fastener can include, but is not limited to a thumb screw, bolt, snap fit, rivet, ball and socket joint, or other fastener. In an example the fastener can be articulated. For example, the adapter 118 can be adjustable to swivel or tilt the action camera 116 with respect to the vessel 102. The camera mount 104 and/or the adapter 118 can be constructed from a material including, but not limited to plastic (e.g., acrylonitrile butadiene styrene, polycarbonate, polyamide, Polyoxymethylene), or the like. A thumb screw can couple one or more hinge surfaces of the action camera 116 to one or more hinge surfaces of the adapter 118. In another example, the adapter can include threaded boss and socket, for instance, a tripod connection per ISO 1222: 2010, such as ¼-20 UNC or ⅜-16 UNC treaded connection.

In an example, the camera mount 104 can include a camera mount interface 120 for coupling the camera mount 104 to the vessel 102. The camera mount interface 120 can include, but is not limited to, a latch, guide, rail, snap, fastener, or the like. For instance, the camera mount 104 can include mating features 122 that are engagable with the camera mount interface 120. In an example, the camera mount interface 120 can include a pair of retention members 124. The mating features 122 of the camera mount 104 can latch on to the retention members 124 to couple the camera mount 104 to the vessel 102. In an example, the camera mount interface 120 can include a universal action camera mount geometry. For instance, the retention members 124 of the camera mount interface 120 can include geometry used by one or more action camera producers. In an example, the camera mount interface 120 or the mating features 124 can be interchangeable. For instance, the vessel 102 can include features for coupling two or more camera mount interfaces 120 to the vessel 102, such as a first camera mount interface 120 for coupling a first action camera 116 and a second camera mount interface 120 for coupling a second action camera 116. The first and second camera mount interfaces 120 can be interchangeable for mounting either the first or the second action camera 116.

The vessel 102 can include a socket 114 for positioning an action camera 116 closer to a center of gravity of the vessel 102. For instance, the socket 114 can include a depression or dimple along the exterior surface 108 of the vessel 102. In an example, the socket 114 can be a separate component that can be attached to the vessel 102. The socket 114 can be constructed from materials including, but not limited to plastic (e.g., acrylonitrile butadiene styrene, polycarbonate, polyamide, polyoxymethylene), rubber, foam, or the like. The camera mount 104 can be located in or near the socket 114. The action camera 116 can be at least partially located within the socket 114. For instance, the socket 114 can at least partially surround a back and multiple sides of an action camera 116. Accordingly, the action camera 116 can be located closer to the center of gravity of the vessel 102 by at least partially locating the action camera 116 within the socket 114.

As shown in the examples of FIGS. 1, 3, 4, and 6, the vessel 102 can include a positioning track 112. The positioning track 112 can couple the positioning weight 106 to the vessel 102. The positioning weight 106 can be adjustably positioned along the positioning track 112. In an example, the positioning track 112 can extend around the exterior surface 108. For instance, the positioning track 112 can be located along a plane bisecting the vessel 102, for example along a circumference or perimeter of the vessel 102. In some examples, the positioning track 112 can extend from a first side of the socket 114 to a second side of the socket 114, along three-quarters of the perimeter of the exterior surface 108 of the vessel 102, along half of the perimeter of the vessel 102, or the like. In an example, the vessel 102 can include two or more positioning tracks 112. Each positioning track 112 can include a positioning weight 106 adjustably positionable along the positioning track 112. Accordingly, the orientation of the vessel 102 and correspondingly the camera mount 104 can be adjusted along two or more axis simultaneously.

A location of the positioning weight 106 can orient the vessel, and correspondingly the action camera 116, by adjusting the center of gravity of the vessel 102. For instance, the center of gravity of the vessel 102 can be adjusted to a location between a center of buoyancy and the positioning weight 106. Accordingly, the vessel 102 can be oriented (or re-oriented) with the positioning weight 106 located underneath the vessel 102.

The positioning weight 106 can be constructed from a material including, but not limed to metal (e.g., cast iron or stainless steel), sand, cement, polymer, or other. For instance, the positioning weight 106 can include a polymer casing filled with sand. In an example, the casing can be openable for a user to add weight to the casing, for example, sand, stones, or the like. The openable casing can reduce the weight of the floating action camera mount 100 during transport and the user can add mass to the positioning weights 106 as needed. In an example, metal positioning weight 106 can be coated, painted, or enameled for corrosion resistance or improved cosmetics. A mass of the positioning weight 106 can orient or stabilize the floating action camera mount 100. For instance, the mass of the positioning weight 106 can exceed the combined mass of the action camera 116 and the camera mount 104 and accordingly orient the floating action camera mount 100 in a position where the positing weight 106 is located below the center of gravity of the vessel 102. The positioning weight 106 can have a mass including, but not limited to, between one and ten pounds-mass.

Figure 2:
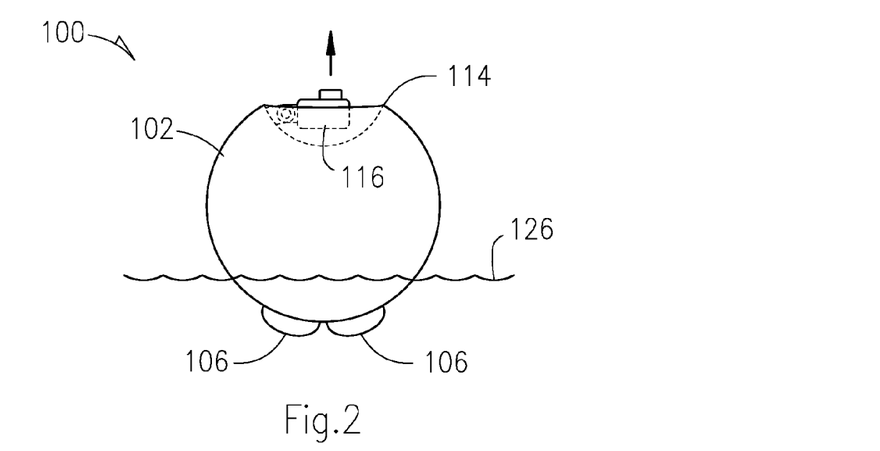
FIG. 2 illustrates an exemplary floating action camera mount including a plurality of positing weights located opposite of a camera mount and a viewpoint of the camera is oriented upwards, according to an embodiment.

The positioning weight 106 can be adjustably positionable along the exterior surface of the vessel between at least a first weight location and a second weight location as shown in FIG. 2 and described further herein. In the example of FIG. 1, the positioning weight 106 can be coupled along the positioning track 112. In an example, the positioning weight 106 can be securable at a plurality of respective weight locations along the positioning track 112 between the first weight location and the second weight location. The location of the positioning weight 106 can adjust the orientation of the vessel 102 and correspondingly the camera mount 104. For instance, in the first weight location, the vessel 102, and correspondingly the camera mount 104, can be positioned in a first orientation with respect to a surface of the liquid 126. In the second weight location, the vessel 102, and correspondingly the camera mount 104, can be positioned in a second orientation with respect to the surface of the liquid 126. In the examples of FIGS. 1, 3, 4, and 6 the positioning weight 106 can be coupled along a positioning track 112.

In an example, the exterior surface 108 of the vessel 102 can include a plurality of positioning weight couplings. The positioning weight couplings can be located along one or more surfaces or sides of the vessel 102. For example, the positioning weight couplings can be distributed around the exterior surface 108 of the vessel 102. Accordingly, the vessel 102, and correspondingly the view point of the action camera 116, can be oriented toward a wide variety of directions.

Figure 3:
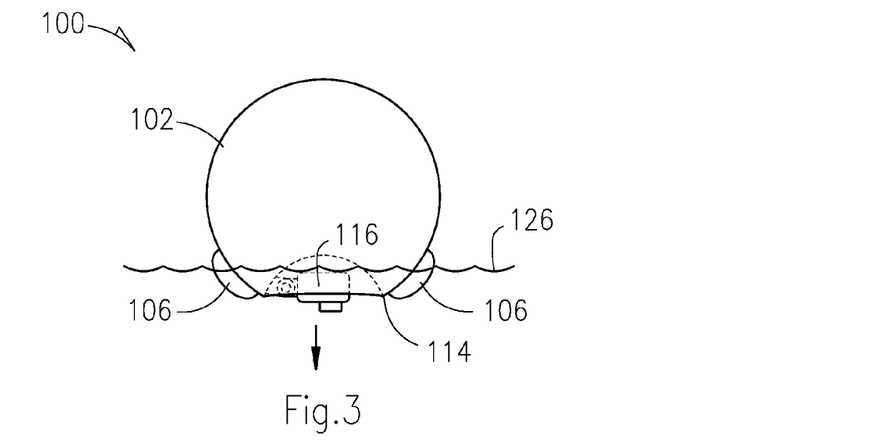
FIG. 3 illustrates an exemplary floating action camera mount including a plurality of positing weights, a first positioning weight located on a first side of a camera mount and a second positioning weight located on a second side of the camera mount, wherein a viewpoint of the camera is oriented downwards, according to an embodiment.

FIGS. 2-4 depict examples of the floating action camera mount 100 including two positioning weights 106. The floating action camera mount 100 can be oriented towards almost any direction according to the location of the at least one positioning weight 106. In the example of FIG. 2, the two positioning weights 106 can be positioned in a location opposite of the socket 114 or the camera mount 104. Accordingly, the vessel 102, and correspondingly the camera mount 104, can be positioned to orient a viewpoint of the action camera 116 in an upward direction with respect to the surface of the liquid 126. For instance, the action camera 116 can capture images above the floating action camera mount 100.

In the example of FIG. 3, a first positioning weight 106 can be positioned near a first side of the socket 114 or the camera mount 104. A second positioning weight 106 can be positioned near a second location near the socket 114 or the camera mount 104. Accordingly, the vessel 102, and correspondingly the camera mount 104, can be positioned to orient the viewpoint of the action camera 116 in a downward direction with respect to the surface of the liquid 126. For instance, the action camera 116 can capture images underwater (e.g., under the surface of the liquid 126).

In the example of FIG. 4, the two positioning weights 106 can be positioned in a location lateral to the socket 114 or the camera mount 104. Accordingly, the vessel 102, and correspondingly the camera mount 104, can be positioned to orient the viewpoint of the action camera 116 in a substantially horizontal direction (e.g., within thirty-degrees above or below the surface of the liquid). For instance, the viewpoint of the action camera 116 can be oriented out across the surface of the liquid 126. For instance, the action camera 116 can capture images above the floating action camera mount 100.

Figure 5:
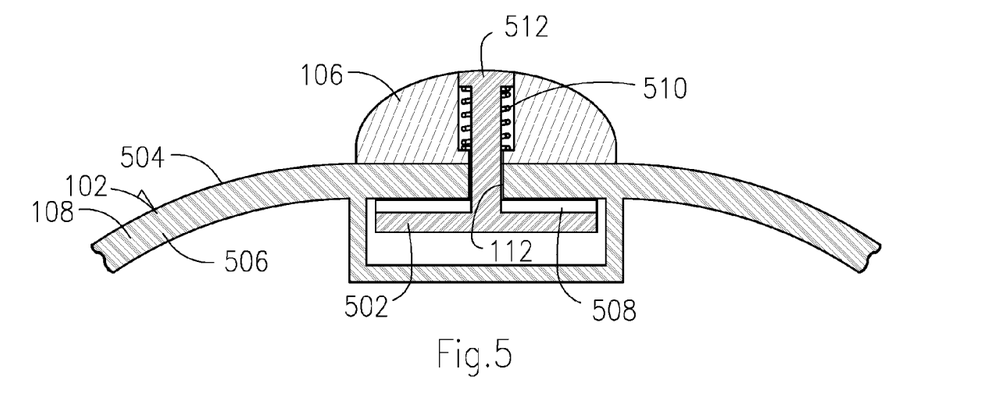
FIG. 5 is a cross section view along a longitudinal direction of a positioning track including an exemplary positioning weight and a grip member in a clamped configuration, according to an embodiment.
Figure 6A:
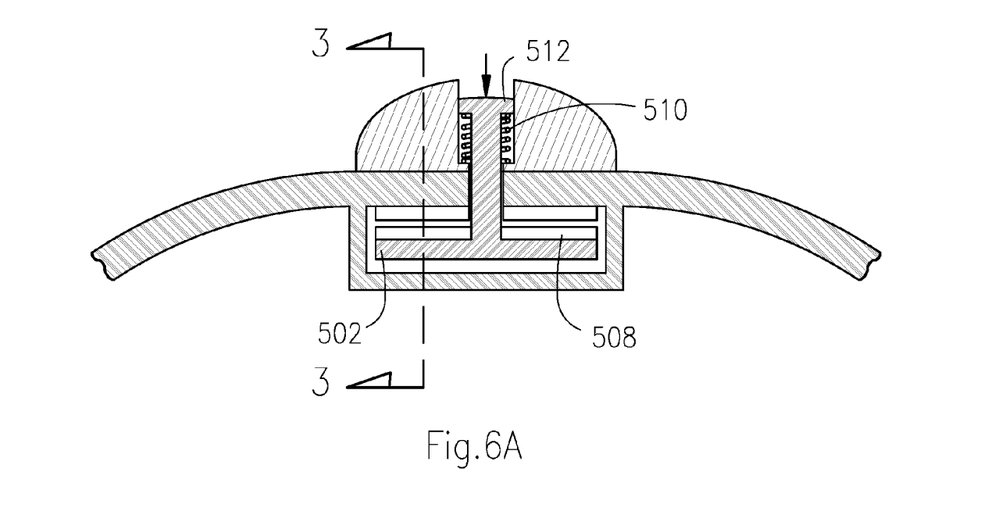
FIG. 6A is a cross section view along a longitudinal direction of a positioning track including an exemplary positioning weight and a grip member in a moveable configuration, according to an embodiment.

FIGS. 5 and 6A illustrate a cross section view along a longitudinal direction of a positioning track including of an example of the floating action camera mount 100 with a positioning weight 106 having a grip member 502. The grip member 502 can be movably coupled to the positioning weight 106. For instance, the grip member 502 can include a moveable configuration (FIGS. 6A and 6B) and a clamped configuration (FIG. 5). As previously described, the exterior surface 108 of the vessel 102 can include the positioning track 112, an outside surface 504, and an inside surface 506. For instance, the positioning track 112 can include a groove or channel located along or through the exterior surface 108. In an example, the grip member 502 can be disposed through the positioning track 112 to couple the positioning weight 106 to the positioning track 112. The grip member 502 can translate with respect to the positioning weight 106 between the movable configuration and the clamped configuration.

Figure 6B:
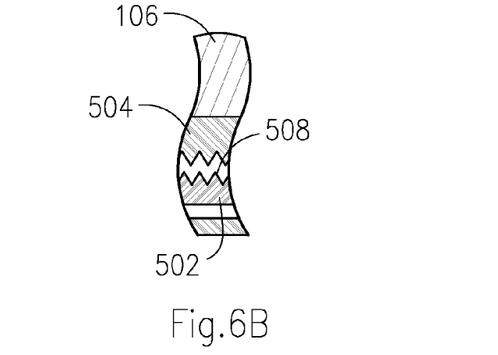
FIG. 6B is a cross section view along a transverse direction to a positioning track including of an exemplary positioning weight and a grip member in a moveable configuration, according to an embodiment.

In the example of FIG. 5, the positioning weight 106 is shown in the clamped configuration. The grip member 502 can be positioned in contact with the inside surface 506. Friction or mechanical features (e.g., teeth 508) can secure the positioning weight 106 to the vessel 102. The positioning weight 106 can include a biasing element 510 for providing a clamping force between the grip member 502 and the exterior surface 108 (e.g., the inside surface 506 as shown in FIG. 5). For instance, the biasing element 510 can be positioned between an actuator 510 and the outside surface 504. In an example, the teeth 508 can be disposed from the external surface 108, such as the inside surface 506. FIG. 6B illustrates a cross section along a transverse direction to the positioning track 112 that shows an example of the teeth 508 in the moveable configuration. The grip member 502 can include teeth 508 that can interlock with the teeth 508 of the exterior surface 108. When the teeth 508 are interlocked, the teeth 508 can increase a mechanical hold between the positioning weight 106 and the external surface 108.

FIGS. 6A and 6B show an example, of the positioning weight 106 and the grip member 502 in the movable configuration. The actuator 512 can be coupled to the grip member 502. In one example, the actuator 512 can be configured to move the grip member 502 from the clamped configuration to the movable configuration. For instance, the actuator 512 can be a push rod on the outside of the positioning weight 106 that can be depressed by the user in order to move the grip member 502 out of contact with the inside surface 506. When the actuator 512 is depressed, the biasing element 510 can be compressed between the actuator 512 and the outside surface 504 or the positioning weight 106. In the movable configuration, the positioning weight 106 can be adjustably positioned along the exterior surface 108 of the vessel 102, such as along the positioning track 112. When the user releases the actuator 512, the biasing element 510 can expand and reposition the grip member 502 in the clamped configuration.

Figure 7:
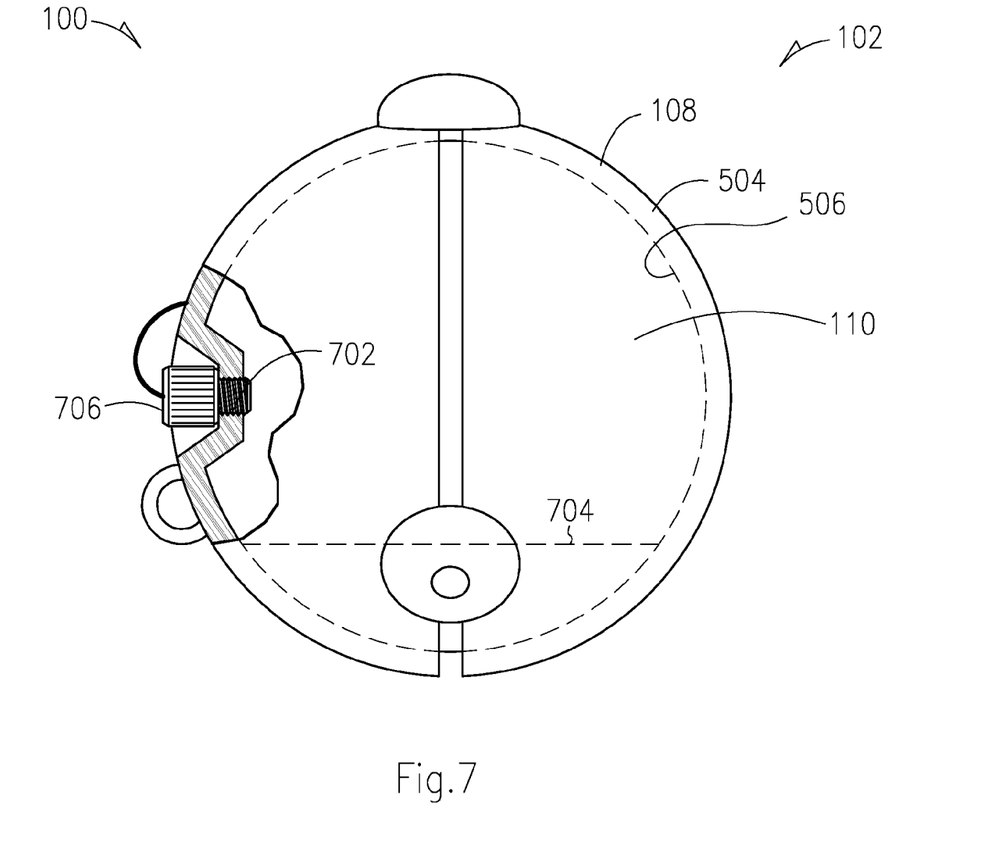
FIG. 7 illustrates an example of a floating action camera mount that includes a cavity and a sealable port, according to an embodiment.

FIG. 7 is an exemplary floating action camera mount 100 including a sealable port 702. The sealable port 702 can include a channel extending through the exterior surface 108 from the outside surface 504 to the inside surface 506.

Ballast 704 can be added to the vessel 102 (e.g., to the internal volume 110 or cavity) through the sealable port 702. For instance, ballast 704 can include, but is not limited to, sand, water, rocks, soil, or the like. The ballast 704 can increase the mass of the vessel 102, lower the center of gravity of the vessel 102 with respect to the center of buoyancy, or both. Accordingly, the stability of the vessel 102 can be increased by adding the ballast 704 to the vessel 102. In an example, the weight of the vessel 102 can be minimized for transportation by transporting the floating action camera mount 100 with reduced ballast 704. The sealable port 702 can be sized and shaped to accommodate a variety of types of ballast 704. For instance, the sealable port 702 can include a diameter or width including, but not limited to, between one-half inch and six-inches. In an example, the ballast 704 can include materials or objects sourced from the natural settings of a user's destination.

The sealable port 702 can seal the internal volume 110 of the vessel 102. In an example, the sealable port 702 can include a plug 706 adapted to seal the internal volume 110 of the vessel 102. For instance, the plug 706 can be threaded or press fit into the sealable port 702 to form a seal between the sealable port 702 and the plug 706. Accordingly, the sealable port 702 and the plug 706 can increase the retention of ballast 704 added to the internal volume 110 of the vessel 102 and minimize unintended entry of additional ballast 704 (such as water).

Figure 8:
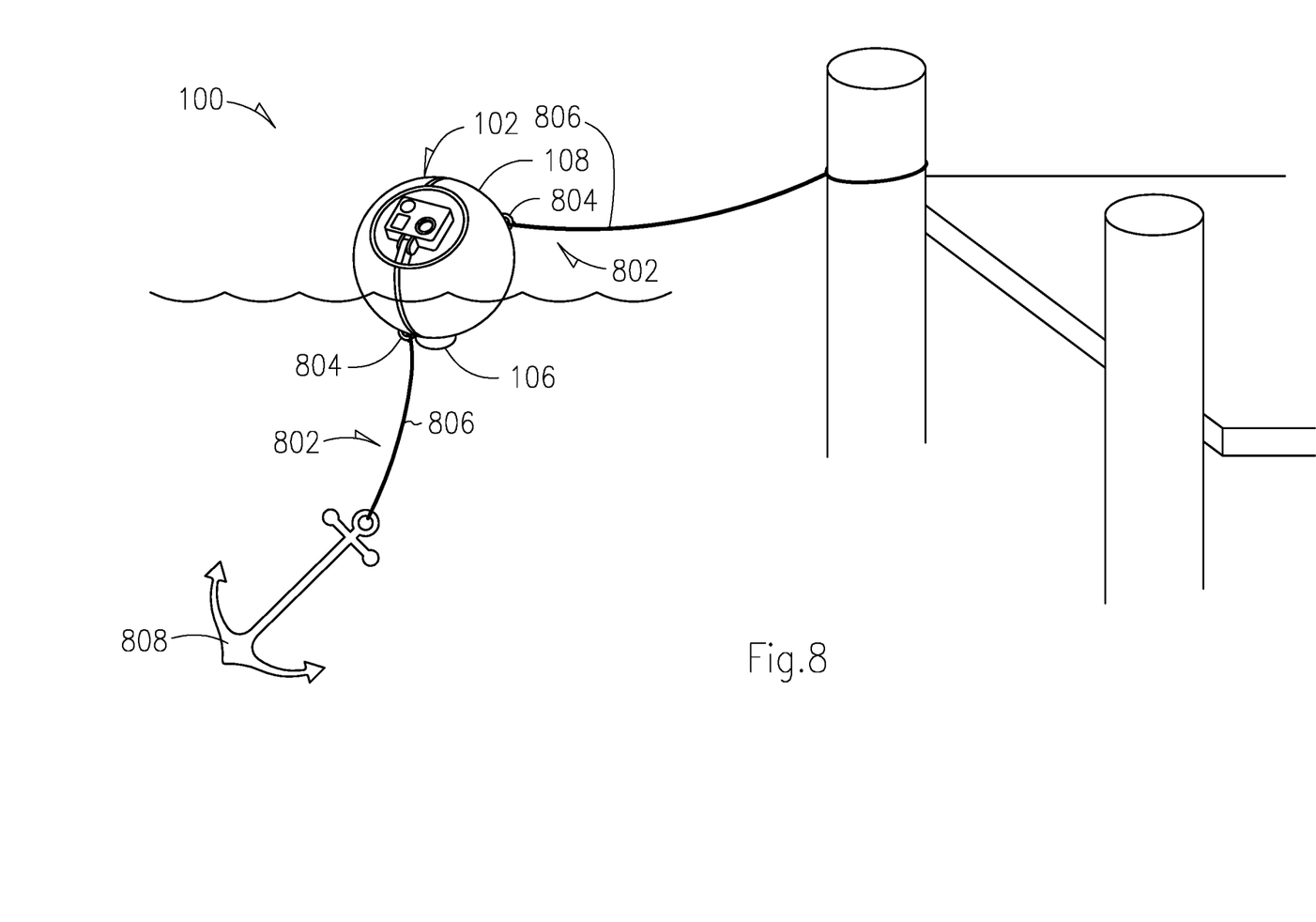
FIG. 8 illustrates an example of a floating action camera mount including a securing device, according to an embodiment.

FIG. 8 depicts an example of the floating action camera mount 100 including a securing device 802. The securing device 802 can include, but is not limited to, a tether 806, an anchor 808, a drift sock, or the like. An eyelet 804 can be coupled to the vessel 102. For instance, the eyelet 804 can be coupled to the sealable port 702, the exterior surface 108, the positioning weight 106, the socket 114, or other part of the floating action camera mount 100. In an example, the eyelet 802 can be integral with the sealable port 702, the exterior surface 108, the positioning weight 106, the socket 114, or other part of the floating action camera mount 100. For instance the eyelet 802 can be molded into the exterior surface 108 or sealable port 702. The securing device 802 can be attached to the eyelet 804. For instance, the securing device 802 can be located through the eyelet 804 and be tied, crimped, fastened, or otherwise attached to the eyelet 804.

In the example of FIG. 8, the securing device 802 includes the tether 806. The tether 806 can be coupled to one or more of a dock, boat, a user, or the like. The tether 806 can include, but is not limited to, a segment of rope, cable, chain, or other. As shown in the example of FIG. 8, the tether 806 can couple one or more of the anchor 808, drift sock, or other item to the floating action camera mount 100 individually or in combination. The anchor 808 can minimize movement of the floating action camera mount 100 along the surface of the liquid 126.

FIG. 9 shows an exemplary floating action camera mount 100 including an inflatable vessel 902 (e.g., an inflatable bladder). For example, the inflatable vessel 902 can be inflated for buoyancy or can be deflated for transport or storage. In other words, the size of the inflatable vessel 902 can be reduced (e.g., flattened) in a deflated state. The inflatable vessel 902 can include a pliable exterior surface 904. For instance, the pliable exterior surface 904 can be constructed from a material, including, but not limited to, a polymer (e.g., low density polyethylene, vinyl chloride, polyvinyl chloride, polyamide, or polychloroprene), rubber, or other material. In the example of FIG. 9, the pliable exterior surface 904 is indicated by a dashed line.

In an example, the socket 114, camera mount 104, and positioning weight 106 can be constructed as previously described herein. In the example of FIG. 9, the positioning track 112 can include a frame to support a shape of the positioning track 112. For instance, the frame can include a cross section profile forming the positioning track 112 along the length of the frame. The frame can include, but is not limited to, a circular, arcuate, rectangular, or other shape. The camera mount 104, socket 114, and positing track 112 can be constructed from materials including, but not limited to, acrylonitrile butadiene styrene, polycarbonate, polyamide, polyoxymethylene, or the like. Accordingly, the pliable exterior surface 904 of the inflatable vessel 902 can be inflatable and other components of the floating action camera mount 100, such as the socket 114, camera mount 104, and positing track 112, can be structural for supporting the action camera 116, positioning weight 106, eyelet 804, or other component.

The inflatable vessel 902 can be inflated through the sealable port 702. For instance, the user can inflate the inflatable vessel 902 with the user's breath. In an example, the inflatable vessel 902 can be inflated through an inflation port 906. The inflation port 906 can include a needle valve body adapted to accept an inflation needle. In an example, the inflation port 906 can be similar to those found on a basketball, volleyball football, beach ball, or the like. Accordingly, the floating action camera mount 100 can be inflatable to provide buoyancy where the floating action camera mount 100 can be in use and deflatable for transportation or storage.

Figure 10:
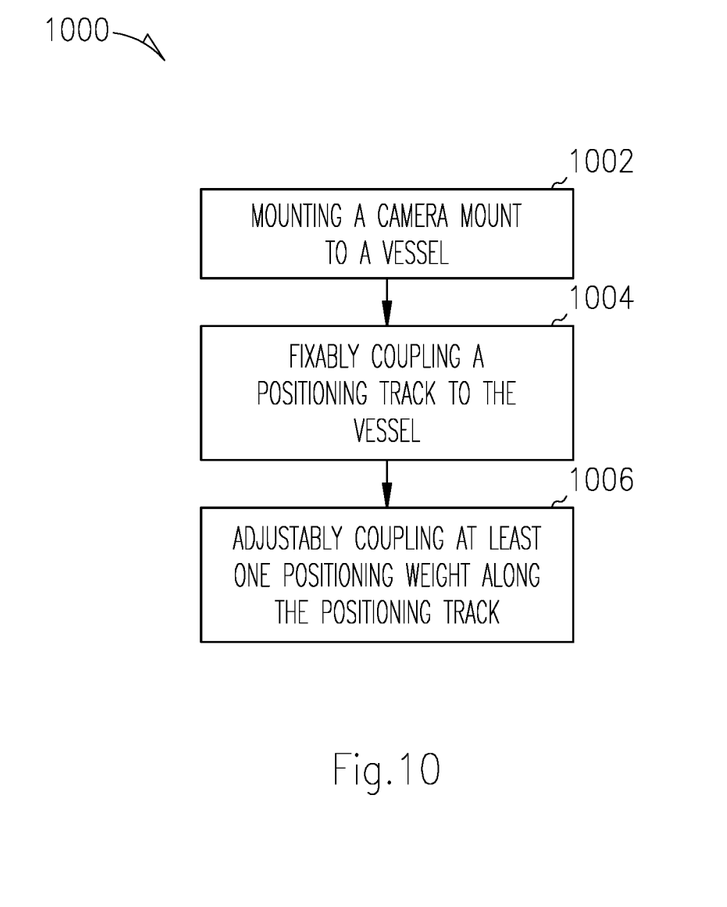
FIG. 10 is block diagram of an exemplary technique for making a floating action camera mount, according to an embodiment.

FIG. 10 is a block diagram of an example of a method 1000 making a floating camera mount, such as a floating action camera mount 100 as previously described in the examples herein and shown for instance in FIGS. 1-9. In describing the method 1000, reference is made to one or more components, features, functions, and steps previously described herein. Where convenient, reference is made to the components, features, steps and the like with reference numerals. Reference numerals provided are exemplary and are nonexclusive. For instance, features, components, functions, steps, and the like described in the method 1000 include, but are not limited to, the corresponding numbered elements provided herein. Other corresponding features described herein (both numbered and unnumbered) as well as their equivalents are also considered.

At 1002, the camera mount 104 can be coupled (e.g., mounted) to the vessel 102. In an example, the vessel 102 can include a substantially spherical shape. The vessel 102 can include the exterior surface 108 and the internal volume 110. In an example, the internal volume 110 can include the cavity. For instance, the cavity can be molded, cut, or otherwise formed within the vessel 102. In an example, the sealable port 702 can be coupled between the external surface 108 and the cavity (e.g., internal volume 110) as previously described herein. The sealable port 702 can be adapted to include the sealed configuration and the open configuration. For instance, the sealable port 702 can include the plug 706. The plug 706 can be threaded or press fit into the sealable port 702 to seal the cavity.

In an example, the eyelet 804 can be coupled to the exterior surface 108 of the vessel 102. The securing device 802 can be attachable to the eyelet 804 as previously described herein. The securing device 802 can include, but is not limited to a tether 806, an anchor 808, or any combination thereof.

In an example, the socket 114 can be coupled to the vessel 102 or the socket 114 can be integrated into the vessel 102

(e.g., the socket 114 can be molded or formed within the vessel 102). The camera mount 104 can be coupled to the socket 114 or the exterior surface 108. Accordingly, the action camera 116 can be coupled to the vessel 102 by the camera mount 104. The socket 114 can be shaped to at least partially surround the back and sides of the action camera 116 that is at least partially locatable therein.

In an example, the camera mount 104 can be coupled to the inflatable vessel 902. For instance, the inflatable vessel 902 can be inflatable and deflatable between an inflated configuration and a deflated configuration. The socket 114, camera mount 104, and positioning weight 106, and positioning track 112, can be constructed as previously described herein.

At 1004, the positioning track 112 can be coupled (e.g., fixably coupled) to the vessel 102 as previously shown in FIGS. 1-9 and described herein. For instance, the positioning track 112 can be located along a plane bisecting the vessel 102, for example along the circumference or perimeter of the vessel 102. In some examples, the positioning track 112 can extend from the first side of the socket 114 to the second side of the socket 114, along three-quarters of the perimeter of the exterior surface 108 vessel 102, along half of the perimeter of the vessel 102, or the like.

At 1006, at least one positioning weight 106 can be adjustably coupled along the positioning track 112. The positioning weight 106 can be secured at the first weight location, the second weight location, or any location therebetween. In the first weight location, the vessel 102, and correspondingly the camera mount 104, can be positioned in a first orientation with respect to a surface of the liquid 126. In the second weight location, the vessel 102, and correspondingly the camera mount 104, can be positioned in a second orientation with respect to the surface of the liquid 126. As previously described herein and shown in the examples of FIGS. 5 and 6, the positioning weight 106 can be coupled to the grip member 502. For instance, the grip member 502 can be movably coupled to the positioning weight 106. The grip member 502 can be adjustable between a moveable configuration and a clamped configuration. For instance, in the movable configuration, the positioning weight 106 is adjustably positionable along the positioning track 112. In the clamped configuration, the vessel 102 is clamped between the grip member 502 and the positioning weight 106. Accordingly, the location of the positioning weight 106 can be secured along the positioning track 112. In an example, the plurality of teeth 508 can be attached to the exterior surface 108 (e.g., the inside surface 506). The teeth 508 can be located adjacent to the positioning track 112. The teeth 508 can be adapted to engage a plurality of teeth 508 located on the positioning weight 106 and/or the grip member 502. Accordingly, the positioning weight 106 can be secured to the vessel 102, for instance, along the positioning track 112.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

The above description is intended to be illustrative, and not restrictive. For example, the above-described examples (or one or more aspects thereof) may be used in combination with each other. Other embodiments can be used, such as by one of ordinary skill in the art upon reviewing the above description.

Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A floating action camera mount comprising:
   a vessel including an exterior surface and an internal volume, the vessel including a substantially spherical shape, wherein the vessel is floatable in a liquid;
   a camera mount coupled to the exterior surface of the vessel; and
   at least one positioning weight coupled along the vessel, wherein the positioning weight is adjustably positionable along the exterior surface of the vessel between a first weight location and a second weight location including:
      in the first weight location, the vessel, and correspondingly the camera mount, are positioned in the liquid to a first orientation with respect to a surface of the liquid, and
      in the second weight location, the vessel, and correspondingly the camera mount, are positioned in the liquid to a second orientation with respect to the surface of the liquid.

2. The floating action camera mount of claim 1, wherein the internal volume includes a cavity that is sealable from the exterior surface and a sealable port is extended between the exterior surface and the cavity, wherein the sealable port includes a sealed configuration and an open configuration, wherein the sealable port is adapted for adding ballast to the cavity in the open configuration.

3. The floating action camera mount of claim 1, further comprising a positioning track located along the exterior surface of the vessel, wherein the at least one positioning weight is adjustably positionable along the positioning track and securable to the positioning track at a first weight location and a second weight location.

4. The floating action camera mount of claim 3, wherein the positioning weight is securable at a plurality of respective weight locations along the positioning track between the first weight location and the second weight location.

5. The floating action camera mount of claim 4, wherein the positioning weight includes a grip member movably coupled to the positioning weight, wherein the grip member is adjustable between a movable configuration and a clamped configuration, wherein:
   in the movable configuration, the positioning weight is adjustably positionable along the positioning track; and in the clamped configuration, the vessel is clamped between the grip member and the positioning weight, and the positioning weight is secured at the first weight location, the second weight location, or the plurality of respective weight locations along the positioning track.

6. The floating action camera mount of claim 5, wherein the vessel includes a plurality of teeth located adjacent to the positioning track, wherein the teeth are adapted to engage a plurality of teeth located on the positioning weight or the grip member of the positioning weight.

7. The floating action camera mount of claim 1, further comprising an eyelet coupled to the exterior surface of the vessel, wherein the eyelet is attachable to a securing device including one or more of: an anchor or a tether.

8. The floating action camera mount of claim 1, wherein the vessel includes a socket, and wherein the camera mount is at least partially located within the socket and the socket is configured to at least partially surround a back and multiple sides of an action camera that is at least partially locatable within the socket.

9. The floating action camera mount of claim 1, wherein the vessel is an inflatable bladder, the inflatable bladder includes an inflated configuration and a deflated configuration.

10. A floating action camera mount comprising:
    a vessel having a substantially spherical shape and including an exterior surface and an internal volume, wherein the internal volume includes a cavity, and wherein the vessel is floatable in a liquid:
    a camera mount coupled to the exterior surface of the vessel;
    a positioning track located along the exterior surface of the vessel; and
    at least one positioning weight coupled to the positioning track, wherein the positioning weight is adjustably positionable along the exterior surface of the vessel between a first weight location and a second weight location including:
        in the first weight location, the vessel, and correspondingly the camera mount, are positioned in the liquid to a first orientation with respect to a surface of the liquid, and
        in the second weight location, the vessel, and correspondingly the camera mount, are positioned in the liquid to a second orientation with respect to the surface of the liquid.

11. The floating action camera mount of claim 10, wherein the cavity is sealable from the exterior surface and a sealable port is extended between the exterior surface and the cavity, wherein the sealable port includes a sealed configuration and an open configuration, wherein the sealable port is adapted for adding ballast to the cavity in the open configuration.

12. The floating action camera mount of claim 10, wherein the at least one positioning weight is securable to the positioning track at a first weight location and a second weight location.

13. The floating action camera mount of claim 12, wherein the positioning weight is securable at a plurality of respective weight locations along the positioning track between the first weight location and the second weight location.

14. The floating action camera mount of claim 13, wherein the positioning weight includes a grip member movably coupled to the positioning weight, wherein the grip member is adjustable between a movable configuration and a clamped configuration, wherein:
    in the movable configuration, the positioning weight is adjustably positionable along the positioning track; and
    in the clamped configuration, the vessel is clamped between the grip member and the positioning weight, and the positioning weight is secured at the first weight location, the second weight location, or the plurality of respective weight locations along the positioning track.

15. The floating action camera mount of claim 14, wherein the vessel includes a plurality of teeth located adjacent to the positioning track, wherein the teeth are adapted to engage a plurality of teeth located on the positioning weight or the grip member of the positioning weight.

16. The floating action camera mount of claim 10, further comprising an eyelet coupled to the exterior surface of the vessel, and a securing device is attachable to the eyelet, the securing device selected from a group consisting of:
    an anchor, a tether, or any combination thereof.

17. The floating action camera mount of claim 10, wherein the vessel includes a socket, the camera mount is at least partially located within the socket and the socket is configured to at least partially surround a back and sides of an action camera that is at least partially locatable therein.

18. The floating action camera mount of claim 10, wherein the vessel is an inflatable bladder, wherein the inflatable bladder includes an inflated configuration and a deflated configuration.

19. A method of making a floating action camera mount comprising:
    mounting a camera mount to a vessel, the vessel including an inflatable bladder having an exterior surface and an internal volume, wherein the internal volume includes a cavity, and wherein the inflatable bladder is inflatable and deflatable between an inflated configuration and a deflated configuration;
    fixably coupling a positioning track to the vessel; and
    adjustably coupling at least one positioning weight along the positioning track, wherein the positioning weight is securable at a first weight location and a second weight location including:
        in the first weight location, the vessel, and correspondingly the camera mount, are positioned in a liquid to a first orientation with respect to a surface of the liquid, and
        in the second weight location, the vessel, and correspondingly the camera mount, are positioned in the liquid to a second orientation with respect to the surface of the liquid.

20. The method of claim 19, further comprising sealing the cavity from the exterior surface with a sealable port, wherein the sealable port includes a sealed configuration and an open configuration.

21. The method of claim 19, wherein mounting the camera mount to the vessel includes coupling the camera mount to the inflatable bladder.

* * * * *